United States Patent [19]
van der Hijden

[11] Patent Number: 5,733,101
[45] Date of Patent: Mar. 31, 1998

[54] APPARATUS FOR STACKING AND UNSTACKING RECTANGULAR ARTICLES SUCH AS FOR INSTANCE GRIDDLES, PROOFING PANS, CRATES, BAKING PANS AND THE LIKE

[75] Inventor: Augustinus Cornelis Antonius van der Hijden, Utrecht, Netherlands

[73] Assignee: Gebr. van Capelleveen B.V., Netherlands

[21] Appl. No.: 729,954

[22] Filed: Oct. 15, 1996

Related U.S. Application Data

[63] Continuation of Ser. No. 377,848, Jan. 25, 1995, abandoned.

[30] Foreign Application Priority Data

Feb. 2, 1994 [NL] Netherlands ............... 9400162

[51] Int. Cl.⁶ ........................................... B65G 57/04
[52] U.S. Cl. .............. 414/792.9; 414/728; 414/732; 414/797; 414/797.1
[58] Field of Search .................... 414/728, 732, 414/734, 736, 737, 792.9, 793.2, 796.9, 797, 797.1

[56] References Cited

U.S. PATENT DOCUMENTS

| | | |
|---|---|---|
| 3,276,606 | 10/1966 | Marchand . |
| 3,776,393 | 12/1973 | Bargstedt .................... 414/797 X |
| 4,735,539 | 4/1988 | Häkkinen et al. ............. 414/737 X |
| 4,925,361 | 5/1990 | Ellis et al. .................. 414/737 X |

FOREIGN PATENT DOCUMENTS

| | | | |
|---|---|---|---|
| 2652069 | 3/1991 | France . | |
| 2429699 | 1/1976 | Germany . | |
| 2431901 | 1/1976 | Germany . | |
| 2633853 | 2/1978 | Germany . | |
| 3735851 | 5/1989 | Germany ............... | 414/728 |
| 2-88188 | 3/1990 | Japan .................. | 414/737 |
| 2-193817 | 7/1990 | Japan .................. | 414/792.9 |
| 1581439 | 7/1990 | U.S.S.R. .............. | 414/728 |

*Primary Examiner*—Janice L. Krizek
*Attorney, Agent, or Firm*—Michaelson & Wallace; Peter L. Michaelson; John C. Pokotylo

[57] ABSTRACT

An apparatus for stacking and unstacking substantially rectangular articles, such as, for instance, crates or baking pans for bread, the apparatus having at least one guide extending in the longitudinal direction of an article storage area, a lifting trolley mobile over the guide and a lifting arm connected with the lifting trolley. The lifting arm carries a lifting member extending in the width direction of the article storage area and movable upward and downward above the article storage area by means of the lifting arm, at least two guides being provided. Each guide comprises a lifting trolley with a swivellable lifting arm hingedly connected with the lifting trolley. The swivellable lifting arms can each be swivelled in a vertical plane, the swivellable lifting arms being connected, at the end remote from the lifting trolley, with the lifting machine.

12 Claims, 5 Drawing Sheets

5,733,101

APPARATUS FOR STACKING AND UNSTACKING RECTANGULAR ARTICLES SUCH AS FOR INSTANCE GRIDDLES, PROOFING PANS, CRATES, BAKING PANS AND THE LIKE

CROSS REFERENCE TO RELATED APPLICATION

This application is a continuation of patent application Ser. No. 08/377,848, entitled "Apparatus for Stacking and Unstacking Rectangular Articles such as For Instance Griddles, Proofing Pans, Crates, Baking Pans and the Like" filed on Jan. 25, 1995, now abandoned.

BACKGROUND OF THE INVENTION a. Field of the Invention

The present invention relates to an apparatus for stacking and unstacking substantially rectangular articles such as, for instance, griddles, proofing pans, crates and baking pans for bread. The apparatus comprises at least one guide extending in a longitudinal direction of an article storage area, a lifting trolley mobile over the guide and a lifting arm connected with the lifting trolley. The lifting arm carries a lifting machine extending in the width direction of the article storage area. The lifting machine is movable upward and downward above the article storage area by means of the lifting arm.

Such apparatuses are, for instance, used in industrial bread bakeries for manipulating baking or proofing pans that must be temporarily stored in an article storage area and later placed elsewhere, such as, for instance, on a conveyor track system leading to a follow-on system such as, for instance, a baking oven.

b. The Prior Art

A known apparatus comprises a double guide rail construction arranged above an article storage area. The known apparatus comprises a single lifting trolley carrying a vertically arranged lifting arm movable upward and downward in vertical direction. The lifting arm carries a lifting machine at its downward facing end. The lifting machine should be capable of being moved from the bottom to a desired maximum stack height. Thus, the lifting arm has a length at least corresponding to the desired height of the stacks. As a consequence, when the lifting machine is at the maximum stack height, the upper end of the lifting arm is located at a height at least twice the maximum stack height. Hence, a substantial drawback of this known apparatus is that the height of the hall (or room) in which the apparatus is located should be at least twice the desired maximum height of the stacks.

Another drawback of the known apparatus is that the length of the lifting machine is limited because the lifting machine is only supported by a single lifting arm. As a result, the maximum width of the article storage area is limited.

This last drawback also applies to another known apparatus which comprises a double guide rail, the separate rails of which extend in a vertical plane one above the other in a horizontal direction and the double guide rail being arranged next to the article storage area. The lifting machine is connected, at one end thereof, with a lifting trolley mobile over the double guide rail. As the lifting machine is supported at one end only, the entire apparatus should be of a particularly heavy design to guarantee some stability. Such a heavy construction is particularly costly.

The object of the present invention is to provide an apparatus for stacking and unstacking substantially rectangular articles without the above-described drawbacks of the known apparatuses. Another object of the invention is to provide an apparatus for stacking and unstacking substantially rectangular articles that can readily be assembled and maintained.

SUMMARY OF THE INVENTION

To that end, the apparatus of the type mentioned in the opening paragraph is characterized by at least two guides disposed on two sides of the article storage area, each guide comprising a lifting trolley with a lifting arm (or swivelling arm) hingedly connected with the lifting trolley wherein the swivelling arms can each be swivelled in a vertical plane and wherein the swivelling arms are each connected, at the end remote from the lifting trolley, with an end of the lifting machine.

Since the ends of the lifting machine are connected with the swivelling arms hingedly connected with the lifting trolleys, the lifting machine is supported in a stable manner. Further, the lifting machine can be moved to the maximum stack height without parts of the apparatus extending far above the lifting machine. Consequently, almost the entire height of the hall or space in which the apparatus is located can be used for forming a stack. The apparatus according to the present invention also advantageously locates the guide approximately at half the stack height. In general, this means that the guide will be located approximately at eye level, which considerably simplifies the installation and maintenance of the apparatus compared with the known apparatus having the guide disposed above the maximum stack height. Moreover, the swivelling arms can pivot through the highest point, so that the lifting machine moves between the two swivelling arms. This advantageously permits the article storage area, i.e. the area wherein stacks can be formed, to be slightly longer than, or at least the same length as, the guides. Further, a maximum stack height is reached with a minimum swivelling arm length because the swivelling arms can assume the vertical position.

In accordance with a further elaboration of the present invention, the lifting machine can be constructed in different manners. For instance, the lifting machine may comprise a single gripper movably connected with the lifting machine such that the gripper can be moved along the lifting machine in the width direction of the article storage area. With a lifting machine of such design, the articles can be moved in the width direction of the article storage area.

In an alternative embodiment of the present invention, the lifting machine can comprise at least one series of grippers by means of which a row of articles having the width of the article storage area can be picked up. By means of a lifting machine of such design, an entire row of articles having the width of the article storage area can be picked up efficiently in one lifting movement and, for instance, placed on a conveyor track system leading to a baking oven.

Moreover, the lifting machine can comprise two or more series of grippers which may or may not be of different types, one series of grippers being movable into a pick-up position at a time through, for instance, rotation about a horizontal axis. A lifting machine of such design permits, for instance, articles of different types to be picked up. When the series of grippers are of the same type, the series of grippers can successively be brought into the pick-up position and pick up a series of articles, after which, subsequently, two or more rows of articles are simultaneously lifted in one single lifting movement through the swivelling operation of the swivelling arms. Thus, an apparatus of a greater processing capacity is obtained.

The grippers can be constructed based on different principles known per se. For instance, the gripper or series of grippers can be provided with clamping means designed to mechanically engage the articles to be stacked. Further, the gripper or series of grippers can be provided with pneumatic means, such as vacuum cups, for picking up the articles to be stacked and unstacked. Optionally, the grippers can be provided with electromagnetic means for picking up the articles to be stacked and unstacked. Such pneumatic and electromagnetic means advantageously are more universally applicable than the mechanical means whose construction is usually adjusted to the type of article that is to be picked up by it. On the other hand, mechanical means can advantageously pick up relatively heavy articles because the operation is not based on suction force or magnetic force, but typically on the blended mating shapes of the mechanical means and the article to be picked up.

BRIEF DESCRIPTION OF THE DRAWINGS

To explain the present invention, an exemplary embodiment of the apparatus will be described hereinafter with reference to the accompanying drawings. In these drawings.

DETAILED DESCRIPTION

Figure 1:
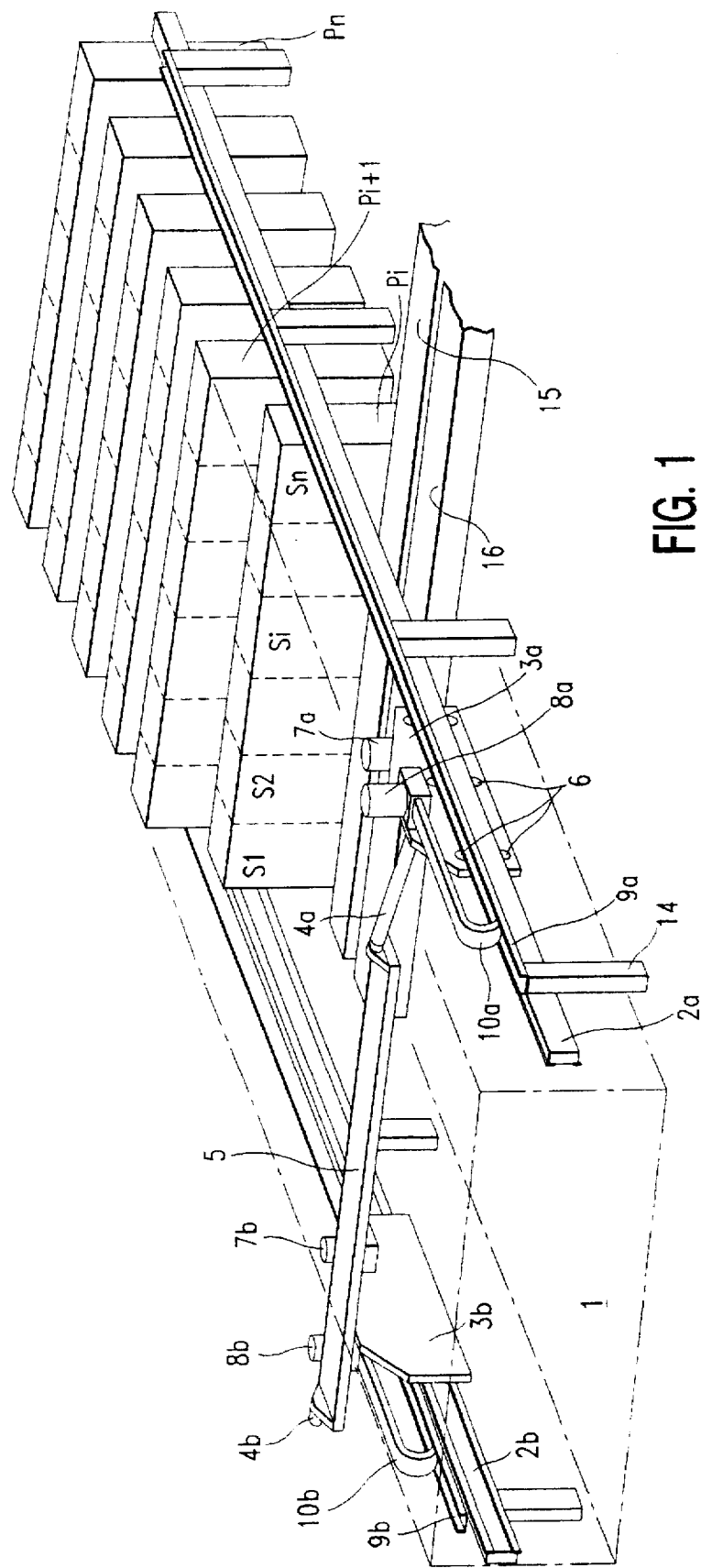
FIG. 1 is a perspective view of an exemplary embodiment of the apparatus.
Figure 3:
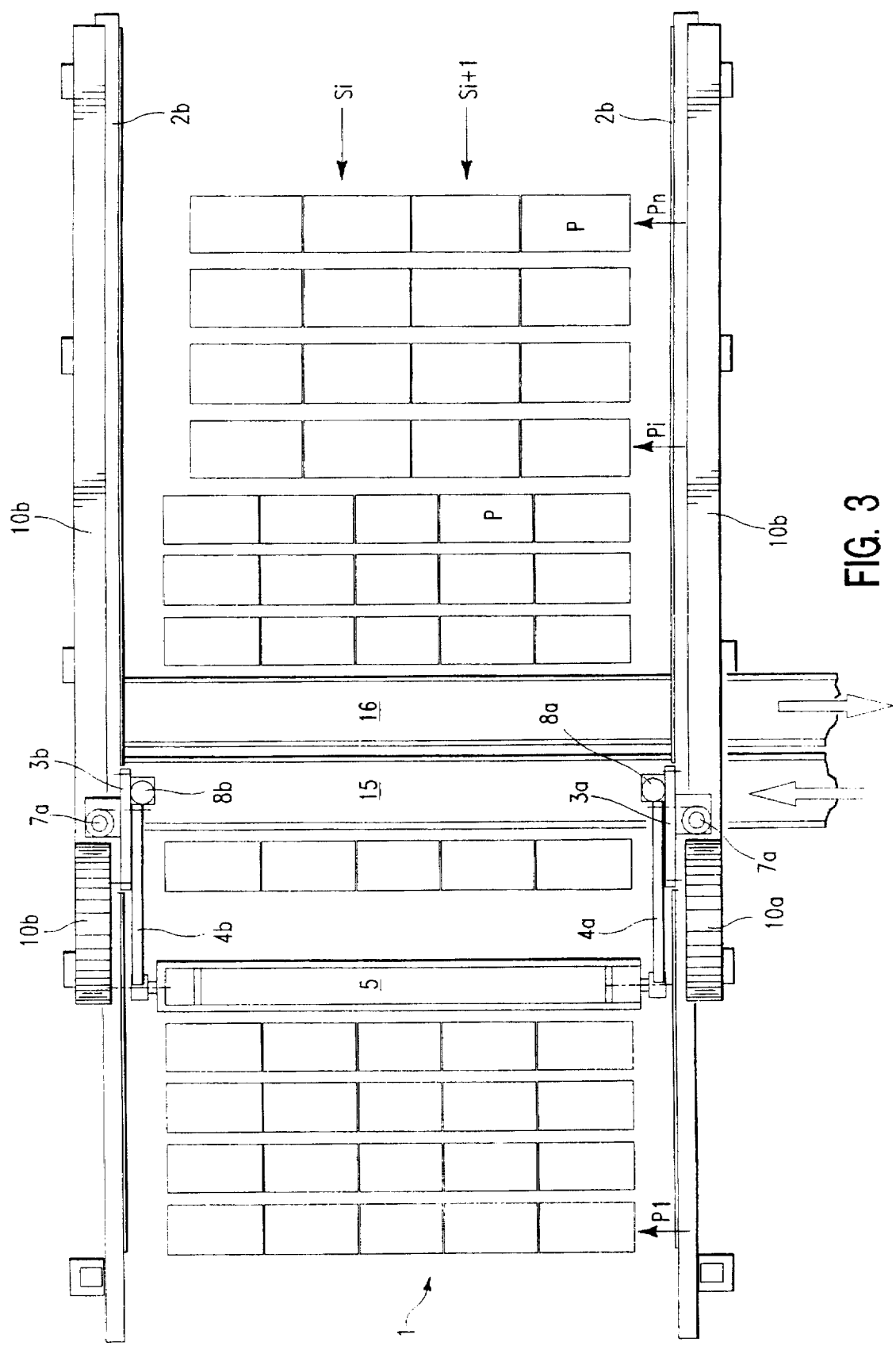
FIG. 3 is a plan view of the exemplary embodiment shown in FIG. 1.
Figure 4:
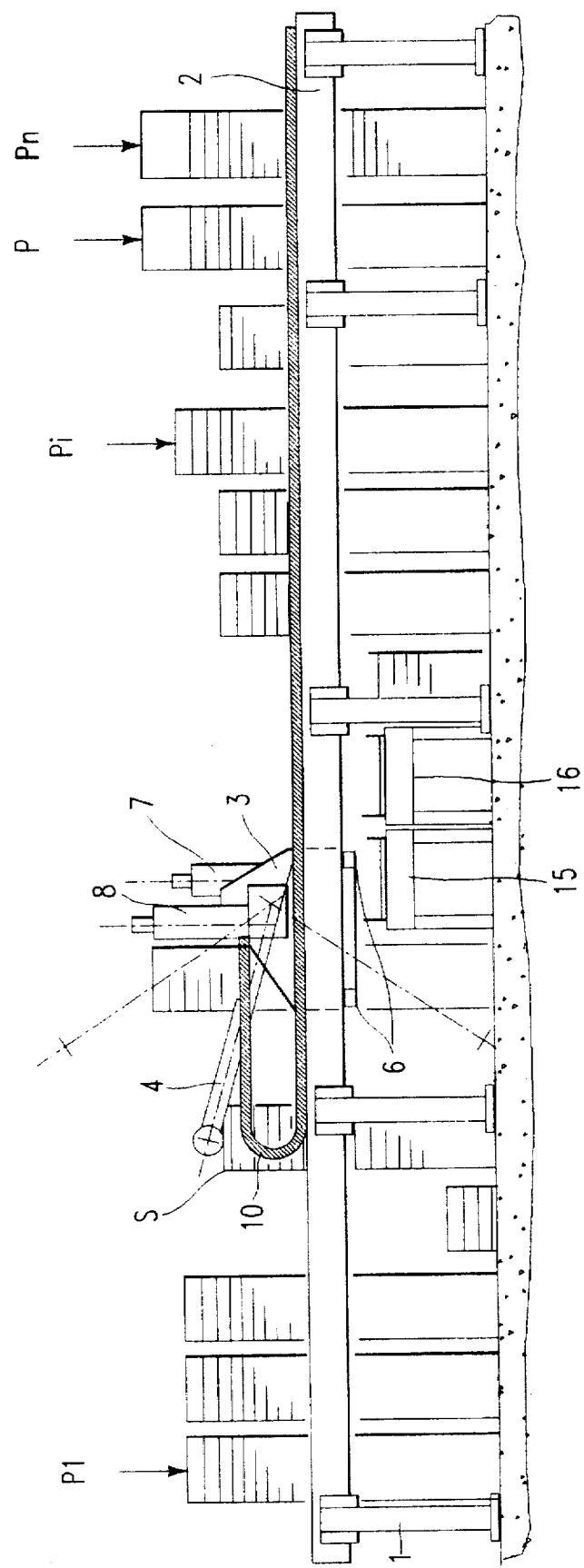
FIG. 4 is a side elevation of the exemplary embodiment shown in FIG. 1.

The exemplary embodiment shown in perspective view in FIG. 1, in top plan view in FIG. 3 and in side elevation in FIG. 4 shows the article storage area 1 in which articles to be stacked, such as, for instance, crates, baking pans, proofing pans P or the like, are to be disposed. The stacks of articles P are arranged in rows $P_1, \ldots P_i, \ldots P_n$, which rows $P_1$ extend in the width direction of the article storage area 1. A row $P_1$ consists of a number of juxtaposed stacks $S_1, \ldots S_i, \ldots S_n$ of articles P. The articles P are fed by one of the conveyor tracks 15, 16, temporarily stored in the article storage area 1 by means of the apparatus according to the present invention and subsequently, by means of the apparatus, placed on one of the conveyor tracks 15, 16 again. The apparatus can be used in an industrial bakery for handling, for instance, baking pans, with the conveyor tracks 15, 16 feeding articles from, or conveying them to, for instance, a baking oven, a proofing box, or a baking pan washing station. A first conveyor track 15 can, for instance, feed the articles P to the article storage area, while the second conveyor track 16, for instance, discharges the articles P from the article storage areas. In some cases only one conveyor belt may suffice, handling both the feed and discharge of the articles P. It is clear that the apparatus is also suitable for moving articles P within the article storage area 1.

Disposed on two sides of the article storage area 1 are guides 2a, 2b. A mobile lifting trolley 3a, 3b is provided over each guide 2a, 2b. The lifting trolleys 3a, 3b are each provided with a swivelling lifting arm 4a, 4b hingedly connected with the lifting trolleys 3a, 3b. The ends of a lifting member 5 are mounted at the ends of the lifting arms 4a, 4b remote from the lifting trolleys 3a, 3b. The lifting machine is adapted to pick up one article, or a series of articles, P such as, for instance, baking pans.

The lifting trolleys 3a, 3b comprise guide wheels 6, at least one of which can be driven via an electromotor 7a, 7b. The drive of the lifting trolley 3a, 3b can also take place via a pinion and rack or with a drive belt. The swivelling motion of the swivelling lifting arms 4a, 4b is obtained by means of electromotors 8a and 8b respectively. The apparatus comprises a drive unit which controls the electromotors 7, 8 such that the swivelling lifting arms 4a, 4b are always in the same mutual angular position and the lifting trolleys 3a, 3b are always in a corresponding position on the associated guides 2a, 2b.

FIGS. 1, 3 and 4 further clearly show cable channels 9a, 9b and cable guide means 10a, 10b containing the feed cables and control cables for the electromotors 7, 8.

The guides 2a, 2b are located approximately at the level of half the stack height and are supported by, for instance, vertical support legs 11. The guides 2a, 2b can also be connected with a wall of the hall or suspended from a ceiling of the hall. A significant advantage of the apparatus according to the present invention is that the construction can be rather light to its stable structure. A further advantage is that the entire height of the hall or space wherein the apparatus is located can be utilized for stacking articles.

Figure 2:
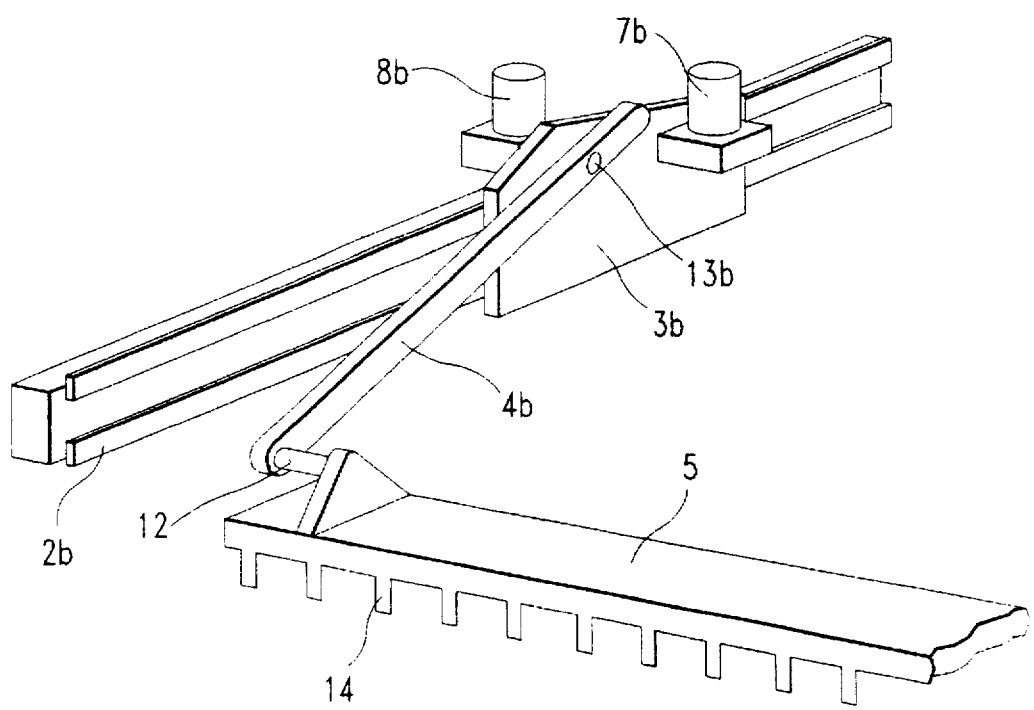
FIG. 2 is a perspective view of a detail of the exemplary embodiment shown in FIG. 1.

FIG. 2 shows a detail of the exemplary embodiment shown in FIG. 1. The reference numerals of FIG. 2 that correspond to the reference numerals of FIG. 1 designate similar parts. AS shown in FIG. 2, the lifting member 5 is hingedly connected with the swivelling lifting arms 4a, 4b via shaft 12. In the exemplary embodiment shown, the lifting member 5 is held in the pick-up position under the influence of gravity. However, when the lifting member 5 comprises several series of grippers for picking up different types of articles P or for simultaneously picking up several series of articles P, the lifting member 5 should be held in a desired position by means of elements present for that purpose, such as, for instance, a steering rod (not shown) or a separate electromotor (not shown) which determines the position of the shaft 12. Hence, the lifting member 5 is arranged so as to be rotatable about shaft 12, enabling the desired gripper to be brought into and maintained in a desired position by means of rotating the lifting member 5 about the shaft 12. The swivelling lifting arms 4a, 4b are each connected with a corresponding lifting trolley 3a, 3b via a shaft 13a (not shown), 13b. The angular position of the shafts 13a, 13b is determined by the corresponding electromotors 8a, 8b.

Figure 5:
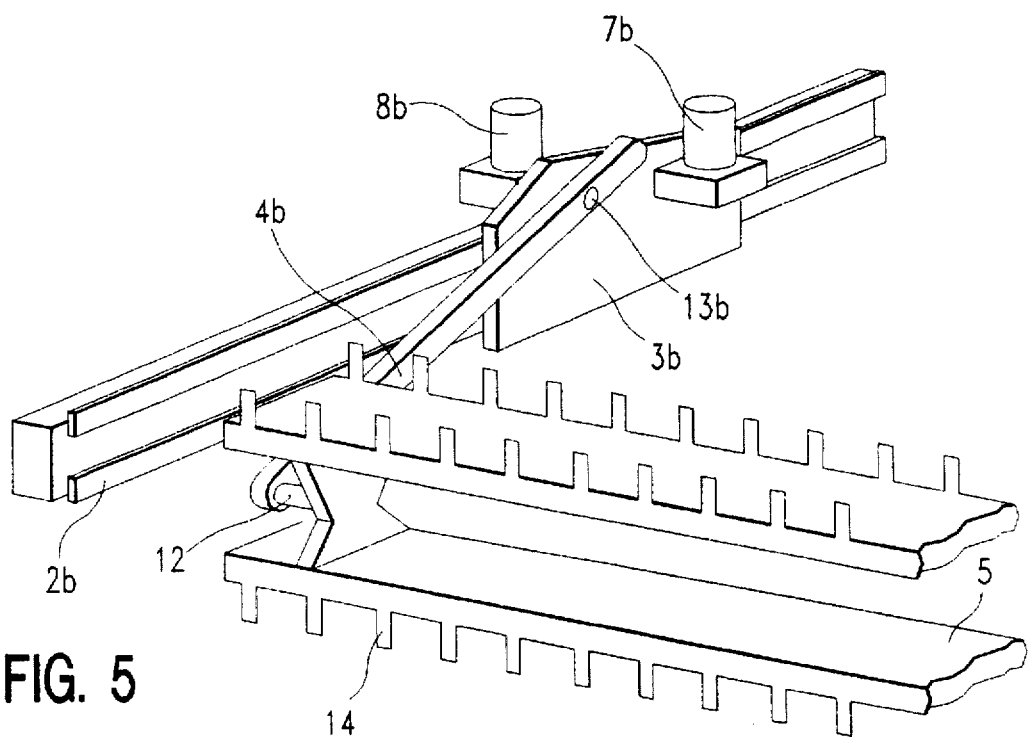
FIG. 5 is a perspective view of an alternative embodiment having a series of grippers.
Figure 6:
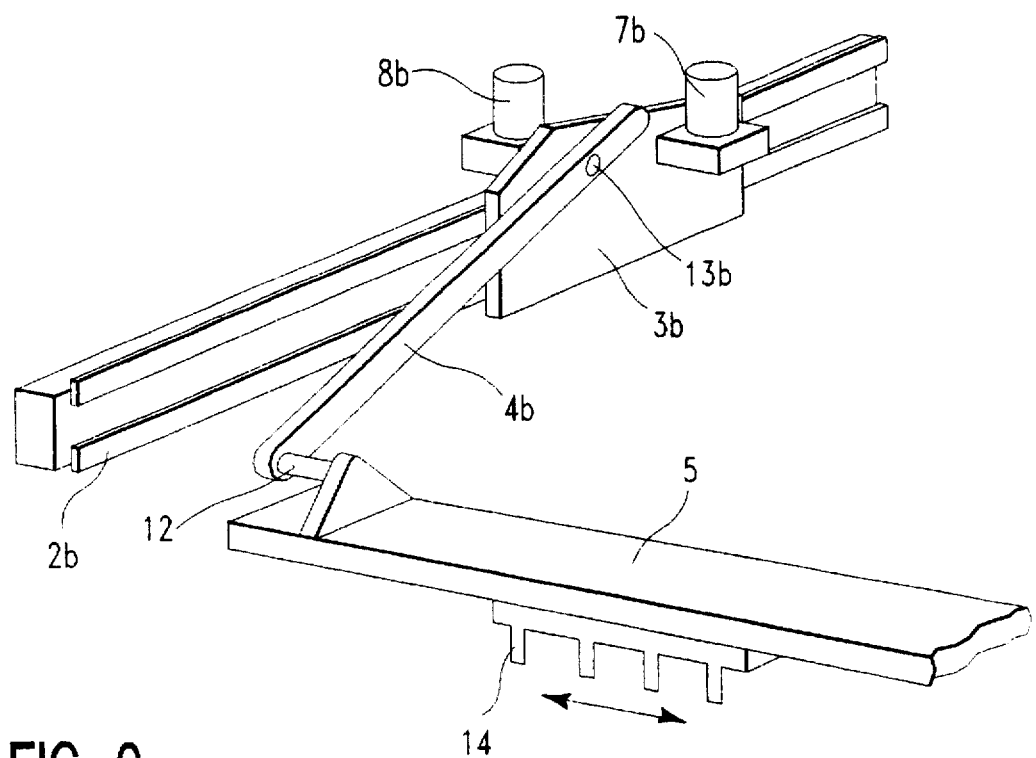
FIG. 6 is a perspective view of an alternative gripper.

The lifting member 5 comprises a gripper and comprise a series of grippers. As shown in FIG. 6, in the case of a single gripper 14, adapted to pick up a single article, it is particularly favorable to connect gripper 14 with the lifting member 5 so as to be movable in the longitudinal direction of the lifting member 5. The movement can for instance be effected by an electromotor controlled via the control. In this manner, it is possible to move articles P in the width direction of the article storage area 1. As shown in FIG. 5, in the case of a series of grippers, it is possible to pick up a series of articles having the width of the series of grippers in one pick-up movement, which width will generally correspond to the width of the lifting member 5 and hence to the width of the article storage area 1. The gripper or series of grippers are not shown in detail, because they may be of a known type. The grippers can function based on mechanical (gripping fingers, gripping sections), pneumatic (vacuum cups) or electromagnetic (electromagnets) techniques. In FIG. 2, the lifting member 5 comprises a series of grippers functioning based on mechanical techniques, i.e. fingers 14 capable of engaging with the articles to be picked up.

It is readily understood that the present invention is not limited to the exemplary embodiment described, but that various modifications are possible within the scope of the invention.

I claim:

1. An apparatus for stacking and unstacking articles in a storage area having a defined longitudinal direction and lateral direction, the apparatus comprising at least two guides extending in the longitudinal direction and disposed on two sides of the article storage area such that the article storage area is located between the at least two guides, each of the at least two guides including a lifting trolley with a swivellable lifting arm hingedly connected with the lifting trolley, the swivellable lifting arms each being connected, at an end remote from the lifting trolley, with a respective end of a lifting member which extends in the lateral direction, wherein the swivellable lifting arms can each be swiveled in a vertical plane thereby moving the lifting member upward and downward, the swivellable lifting arms being able to assume a position above, and substantially perpendicular with, the at least two guides and a position below, and substantially perpendicular with, the at least two guides whereby a maximum stack height is reached with a minimum swivellable lifting arm length.

2. An apparatus according to claim 1, wherein the lifting member comprises at least one series of grippers by means of which a row of articles, having a width approximating a width of the article storage area, can be picked up.

3. The apparatus of claim 1 wherein the swivellable lifting arms are arranged such that they are pivotable through a highest point, so that the lifting member moves between the two swivellable lifting arms.

4. The apparatus of claim 1 wherein each lifting trolley includes means for swiveling the lifting arm associated with the trolley.

5. An apparatus according to claim 1, wherein the lifting member comprises at least one gripper movably connected with the lifting member such that the at least one gripper can be moved along the lifting member in the lateral direction of the article storage area.

6. An apparatus according to claim 5, wherein the lifting member comprises at least two series of grippers, one series of grippers being movable into a pick-up position at a time.

7. An apparatus according to claim 5, wherein the at least one gripper comprises clamping means designed for mechanical engagement with the articles to be stacked and unstacked.

8. An apparatus according to claim 5 wherein the at least one gripper comprises electromagnetic means for picking up the articles to be stacked and unstacked.

9. An apparatus according to claim 5 wherein the at least one gripper comprises pneumatic means for picking up the articles to be stacked and unstacked.

10. The apparatus of claim 9 wherein the pneumatic means includes vacuum cups.

11. An apparatus for stacking and unstacking articles in a storage area having a defined longitudinal, horizontal, direction and lateral direction, the apparatus comprising at least two guides extending in the longitudinal, horizontal, direction and disposed on two sides of the article storage area such that the article storage area is located between the at least two guides, each of the at least two guides including a lifting trolley with a swivellable lifting arm hingedly connected with the lifting trolley, the swivellable lifting arms each being connected, at an end remote from the lifting trolley, with a respective end of a lifting member which extends in the lateral direction, wherein the swivellable lifting arms can each be swiveled in a vertical plane thereby moving the lifting member upward and downward, the swivellable lifting arms being able to assume a position above, and substantially perpendicular with, the at least two guides and a position below, and substantially perpendicular with, the at least two guides whereby a maximum stack height is reached with a minimum swivellable lifting arm length.

12. An apparatus for stacking and unstacking articles in a plurality of stacks in a storage area having a defined longitudinal, horizontal, direction and lateral direction, the plurality of stacks extending in the longitudinal, horizontal, direction, the apparatus comprising at least two guides extending in the longitudinal, horizontal, direction and disposed on two sides of the article storage area such that the article storage area is located between the at least two guides and such that the plurality of stacks extend in parallel with the at least two guides, each of the at least two guides including a lifting trolley with a swivellable lifting arm hingedly connected with the lifting trolley, the swivellable lifting arms each being connected, at an end remote from the lifting trolley, with a respective end of a lifting member which extends in the lateral direction, wherein the swivellable lifting arms can each be swiveled in a vertical plane thereby moving the lifting member upward and downward, the swivellable lifting arms being able to assume a position above, and substantially perpendicular with, the at least two guides and a position below, and substantially perpendicular with, the at least two guides whereby a maximum stack height is reached with a minimum swivellable lifting arm length.

* * * * *